United States Patent
Komu et al.

(10) Patent No.: US 10,412,584 B2
(45) Date of Patent: *Sep. 10, 2019

(54) TRANSMISSION OF AUTHORIZATION INFORMATION

(71) Applicant: Intellectual Ventures I LLC, Wilmington, DE (US)

(72) Inventors: Toni Komu, Oulu (FI); Petri Pohjanen, Oulu (FI); Antti Kilpela, Oulu (FI)

(73) Assignee: Intellectual Ventures I LLC, Wilmington, DE (US)

( * ) Notice: Subject to any disclaimer, the term of this patent is extended or adjusted under 35 U.S.C. 154(b) by 15 days.

This patent is subject to a terminal disclaimer.

(21) Appl. No.: 15/292,492

(22) Filed: Oct. 13, 2016

(65) Prior Publication Data

US 2017/0142582 A1    May 18, 2017

Related U.S. Application Data

(60) Division of application No. 14/023,812, filed on Sep. 11, 2013, now Pat. No. 9,471,888, which is a division
(Continued)

(30) Foreign Application Priority Data

May 2, 2000  (FI) ..................... 20001020

(51) Int. Cl.
*H04M 1/00* (2006.01)
*G06F 17/00* (2019.01)
(Continued)

(52) U.S. Cl.
CPC ............ *H04W 12/06* (2013.01); *G06Q 10/02* (2013.01); *H04L 63/08* (2013.01); *H04W 12/08* (2013.01)

(58) Field of Classification Search
CPC ....... H04L 63/08; G06Q 10/02; H04W 12/06; G06K 19/10; H04Q 7/22
(Continued)

(56) References Cited

U.S. PATENT DOCUMENTS 5,754,654 A    5/1998 Hiroya et al.
5,884,271 A    3/1999 Pitroda
(Continued)

FOREIGN PATENT DOCUMENTS

WO    WO-00/46770    10/2000
WO    WO-01/03040    1/2001
WO    WO-01/39055    5/2001

OTHER PUBLICATIONS

Final Office Action issued on U.S. Appl. No. 14/023,812, dated Jan. 20, 2016.
(Continued)

*Primary Examiner* — Pablo N Tran
(74) *Attorney, Agent, or Firm* — Foley & Lardner LLP; Paul S. Hunter

(57) ABSTRACT

The present invention relates to a method for utilizing a mobile station for the transmission of authorization information requiring verification in a telecommunication network comprising the mobile station. In the method, the information to be verified is transmitted to the mobile station, the authorization information transmitted is presented on the display of the mobile station, the authorization information presented is read from the display of the mobile station, and the authenticity of the authorization information thus read is verified. According to the invention, the authorization information is sent in a form comprising information to be presented in a graphic form, and the authorization information is presented on the display of the mobile station
(Continued)

using a user-independent function of the mobile station in question for the presentation of graphic information.

15 Claims, 2 Drawing Sheets

Related U.S. Application Data of application No. 12/100,270, filed on Apr. 9, 2008, now Pat. No. 8,543,096, which is a continuation of application No. 10/287,761, filed on Oct. 31, 2002, now Pat. No. 7,415,269, which is a continuation of application No. PCT/FI01/00417, filed on May 2, 2001.

(51) Int. Cl.
*H04W 12/06* (2009.01)
*H04L 29/06* (2006.01)
*G06Q 10/02* (2012.01)
*H04W 12/08* (2009.01)

(58) Field of Classification Search
USPC .. 455/414.1, 414.3, 566, 3.06, 181.1, 186.1, 455/411, 412.1, 412.2, 41.1, 41.2, 41.3, 455/432.3, 435.1, 466; 705/26–27, 1, 8, 705/107, 109, 14; 340/820.3, 825.3; 235/375–376, 379–385, 462, 462.01; 701/200, 201
See application file for complete search history.

(56) References Cited

U.S. PATENT DOCUMENTS

| | | | |
|---|---|---|---|
| 6,068,183 A | 5/2000 | Freeman | |
| 6,101,483 A | 8/2000 | Petrovich et al. | |
| 6,223,166 B1* | 4/2001 | Kay | G06Q 10/02 380/51 |
| 6,373,587 B1* | 4/2002 | Sansone | G06K 15/00 358/1.1 |
| 6,427,909 B1 | 8/2002 | Barnes et al. | |
| 6,505,179 B1* | 1/2003 | Kara | G07B 17/00508 101/71 |
| 6,587,835 B1* | 7/2003 | Treyz | G06Q 20/12 705/14.64 |
| 6,651,053 B1 | 11/2003 | Rothschild | |
| 6,658,231 B2 | 12/2003 | Nakatsuyama | |
| 6,732,922 B2* | 5/2004 | Lindgren | G06Q 20/045 235/381 |
| 6,748,365 B1 | 6/2004 | Quinlan et al. | |
| 6,922,672 B1 | 7/2005 | Hailpern et al. | |
| 7,044,362 B2 | 5/2006 | Yu | |
| 7,046,239 B2 | 5/2006 | Asai et al. | |
| 7,063,251 B2 | 6/2006 | Namekawa et al. | |
| 7,083,081 B2 | 8/2006 | McGee et al. | |
| 7,206,647 B2 | 4/2007 | Kumar | |
| 7,305,478 B2* | 12/2007 | Willins | H04L 9/32 709/227 |
| 7,306,143 B2 | 12/2007 | Bonneau et al. | |
| 7,333,946 B1 | 2/2008 | Sipponen | |
| 7,398,248 B2 | 7/2008 | Phillips et al. | |
| 7,480,800 B1 | 1/2009 | Takenaka et al. | |
| 7,512,566 B1 | 3/2009 | Fellner | |
| 7,520,427 B2* | 4/2009 | Boyd | G06Q 10/02 235/382 |
| 7,543,738 B1 | 6/2009 | Saunders et al. | |
| 7,587,756 B2 | 9/2009 | Peart et al. | |
| 7,705,732 B2* | 4/2010 | Bishop | G06Q 20/04 340/5.4 |
| 7,889,052 B2 | 2/2011 | Berardi et al. | |
| 9,697,650 B2* | 7/2017 | Nakfoor | G07B 15/00 |
| 2001/0014870 A1 | 8/2001 | Saito et al. | |
| 2002/0023027 A1* | 2/2002 | Simonds | G06K 7/1095 705/26.1 |
| 2002/0116271 A1 | 8/2002 | Mankoff | |
| 2002/0169623 A1 | 11/2002 | Call et al. | |
| 2003/0065528 A1 | 4/2003 | Matsumoto | |
| 2003/0066883 A1 | 4/2003 | Yu | |
| 2005/0165697 A1 | 7/2005 | Anvekar et al. | |

OTHER PUBLICATIONS

Final Office Action on U.S. Appl. No. 10/287,761, dated Jul. 27, 2007.
Final Office Action on U.S. Appl. No. 12/100,270, dated Dec. 14, 2012.
Final Office Action on U.S. Appl. No. 12/100,270, dated Feb. 26, 2013.
International Search Report for PCT/FI01/00417, dated Sep. 26, 2001.
Non-Final Action on U.S. Appl. No. 10/287,761, dated May 18, 2006.
Non-Final Office Action on U.S Appl. No. 14/023,812, dated May 6, 2015.
Non-Final Office Action on U.S. Appl. No. 10/287,761, dated Dec. 16, 2005.
Non-Final Office Action on U.S. Appl. No. 10/287,761, dated Mar. 8, 2007.
Non-Final Office Action on U.S. Appl. No. 12/100,270, dated May 29, 2012.
Non-Final Office Action on U.S. Appl. No. 12/100,270, dated Feb. 15, 2012.
Non-Final Office Action on U.S. Appl. No. 15/292,492 dated Oct. 3, 2014.
Notice of Allowance on U.S. Appl. No. 10/287,761, dated Jan. 11, 2008.
Notice of Allowance on U.S. Appl. No. 12/100,270, dated May 28, 2013.
Notice of Allowance on U.S. Appl. No. 14/023,812 dated Jul. 6, 2016.

* cited by examiner

TRANSMISSION OF AUTHORIZATION INFORMATION

REFERENCE TO RELATED APPLICATION

This application is a divisional of U.S. patent application Ser. No. 14/023,812, filed Sep. 11, 2013, which is a divisional of U.S. patent application Ser. No. 12/100,270, filed Apr. 9, 2008 (now U.S. Pat. No. 8,543,096), which is a continuation of U.S. patent application Ser. No. 10/287,761, filed Oct. 31, 2002 (now U.S. Pat. No. 7,415,269), which is a continuation of International Application No. PCT/FI01/00417, filed May 2, 2001, which claims priority to Finland Application No. 20001020, filed May 2, 2000, the disclosures of which are incorporated herein by reference in their entirety.

FIELD

The present invention relates to telecommunication. In particular, the invention relates to a new and sophisticated method for utilizing a mobile station for the transmission of authorization information in a telecommunication network.

BACKGROUND

The use of mobile stations as a means of sending and receiving information in the form of text and graphics is constantly increasing. Textual information can be transmitted using e.g. the short message service (SMS). Certain mobile station models are also capable of receiving various logos, icons or messages containing images.

The use of the Wireless Application Protocol (WAP) is gaining ground in solutions requiring a link between portable terminals, such as mobile stations, and Internet applications, e.g. electronic mail, WWW (World Wide Web), news groups. Using the Wireless Application Protocol, it is possible to transmit visual information as well. The Wireless Application Protocol provides an architecture which adapts mobile telephones, browsers used in mobile telephones and the WWW into a functional entity. The HTML (Hyper Text Mark-up Language) used in the WWW is converted into WML (Wireless Mark-up Language), which is a version developed for a wireless environment, when information is to be transmitted to mobile stations. At present, the description language of the WAP standard is the WML language, but the language may also be understood to be any other description language consistent with the future WAP standard. The Wireless Application Protocol consists of the following five layers: Wireless Application Environment (WAE), Wireless Session Layer (WSL), Wireless Transaction Layer (WTP), Wireless Transport Layer Security (WTLS) and Wireless Datagram Layer (WDP). 'Wireless application environment' refers e.g. to a WTA (Wireless Telephone. Application). or to some other appropriated environment. As the lowest layer there is additionally a system-dependent layer which determines the method of conveying information within the system in question. The specifications relating to the Wireless Application Protocol are available at the WWW address www.wapforum.org.

To expand the sphere of application of present-day mobile stations so as to allow even the transmission of information requiring verification, such as various types of admission tickets or cash vouchers or equivalent, many kinds of solutions have been proposed. According to one method, the solution is to transmit the information into a mobile station by utilizing the short message function. Instead of visual verification, the verification can also be accomplished by utilizing e.g. the infrared link of the mobile station or a separate ticket printer, by means of which the user himself prints out the actual ticket to be used, observing instructions received via the Internet or in connection with an order placed via the mobile station.

A problem with a verification procedure implemented using the short message function is that the user is required to perform certain actions to present the information to be verified in connection with the verification procedure. A further problem is that, if only visual verification of the information is desired, it is not possible to add to a normal text message any property or check element of a visual nature. Such visual components include e.g. various images or patterns.

A problem with the-use of an infrared link or a ticket printer is that, in order to be able to use a ticket already ordered and possibly paid for, the user has to perform complicated and time-consuming additional operations with his mobile station.

In addition, in both of the two alternative solutions described above, the user has to transfer the ticket information by some means from the mobile station to an external device in order to obtain from the device an actual ticket showing e.g. a seat number or other essential information. A separate device as described above is necessary because otherwise the text message or business card containing the ticket can be easily forged and/or copied for several people.

SUMMARY

The object of the present invention is to disclose a new type of method that will eliminate the above-mentioned drawbacks or at least significantly alleviate them. A specific object of the invention is to disclose a method that will make it possible to use a mobile station for the transmission of authorization information requiring verification in a telecommunication network.

In the present invention, authorization information requiring verification is transmitted in a telecommunication network using a mobile station. Said telecommunication network comprises said mobile station. 'Authorization information requiring verification' refers to information which can be used to verify a person's/persons' right of admission or right to use a service, or to specify the above-mentioned rights. Examples of such rights are various tickets of admission, seat tickets, cash vouchers and equivalent. The telecommunication network comprises a digital mobile communication network, such as e.g. a GSM network (Global System for Mobile Communication, GSM), UMTS network (Universal Mobile Telecommunication System, UMTS) or equivalent. The mobile communication network preferably comprises, service extensions enabling the transmission of textual and/or graphic information, such as e.g. the implementation of a Short Message Service (SMS), GPRS service (General Packet Radio Service) and/or WAP protocol (Wireless Application Protocol). The authorization information requiring verification is transmitted to the mobile station. Next, the authorization information transmitted is presented on the display of the mobile station. Further, the authorization information presented is read from the display of the mobile station. Finally, the authenticity of the authorization information thus read is verified.

According to the invention, the authorization information is transmitted in a form comprising information to be presented graphically. Examples of this type of information are various graphic patterns and/or arrays of patterns. These allow easy visual verification of the information. In addition to a pattern/array of patterns, additional information e.g. in the form of text or and/or a sequence of digits is transmitted if necessary. Further, according to the invention, the authorization information is presented on the display of the mobile station using a user-independent function of the mobile station in question for the presentation of graphic information, such as e.g. an operator logo function. Thanks to the user of a user independent function, the user is not required to perform any actions in connection with the verification of the information to be verified.

In an embodiment of the invention, an authorization server is provided in conjunction with the telecommunication network, said server being used for the maintenance and transmission of authorization information. In other words, this server maintains the information to be verified, the associated patterns as well as information regarding their rightful owners.

In an embodiment of the invention, the authorization information presented is read manually from the display of the mobile station.

In an embodiment of the invention, the authorization information presented is read from the display of the mobile station mechanically, using e.g. a display reader.

In an embodiment of the invention, the authenticity of the authorization information is verified by transmitting predetermined identification data to a predetermined confirming party. The verification is implemented e.g. as a predetermined service number which is called and to which the identification data is returned, whereupon a confirmation/rejection of authenticity is sent from said service number.

In an embodiment of the invention, the identification data used consists of the subscriber number of the mobile station in question.

In an embodiment of the invention, a predetermined identifier is transmitted as part of the authorization information, and the identifier in question is used as identification data.

In an embodiment of the invention, the above-mentioned authorization server is used as a confirming party.

In an embodiment of the invention, the operator logo function of the mobile station is used as a presentation function. 'Operator logo function' refers to a function implemented in the mobile station and used to present an optional, changeable graphic pattern, such as e.g. the logo of a mobile communication operator, on the display of the mobile station.

In an embodiment of the invention, the WAP Push function of the mobile station the is used a presentation function. 'WAP Push function' refers to a user-independent function whereby information is transmitted to a WAP terminal, preferably a mobile station, without the user having first specifically requested the transmission of the information. The Push function involves three different parties: a WAP client program (in the mobile station), a Push Proxy Gateway and a Push Initiator. The protocol used between the WAP client program and the Push Proxy Gateway is the Push Over-the-Air protocol (Push OTA), and the protocol used between the Push Proxy Gateway and the Push Initiator is the Push Access protocol (PAP). The Push function is more amply described e.g. in 1.2 WAP specification SPEC-PushArchOverwiew-19991108.

As compared with prior art, the present invention has the advantage that the user does not have to perform any time-consuming operations. Prior to the verification of the information, the user has been automatically sent the information requiring verification, in a form that allows it to be directly seen upon visual inspection of the terminal. The information can be checked by the human eye or mechanically if further surety is needed. Further, the present invention makes it difficult to forge and/or make illicit copies of the information to be verified, such as e.g. a ticket of admission. By using ticket-specific unique visual auxiliary information and fast mechanical verification of it, forgery of the ticket can be prevented altogether yet without substantially retarding the process of verification of the information. Moreover, thanks to the present invention, terminal devices already existing at present need not be provided with any accessories and no modifications need to be made in the software used in them to permit verification of the information.

BRIEF DESCRIPTION OF THE DRAWINGS

In the following, the invention will be described by the aid of a few examples of its embodiments with reference to the attached drawing, wherein.

DETAILED DESCRIPTION

Figure 1:
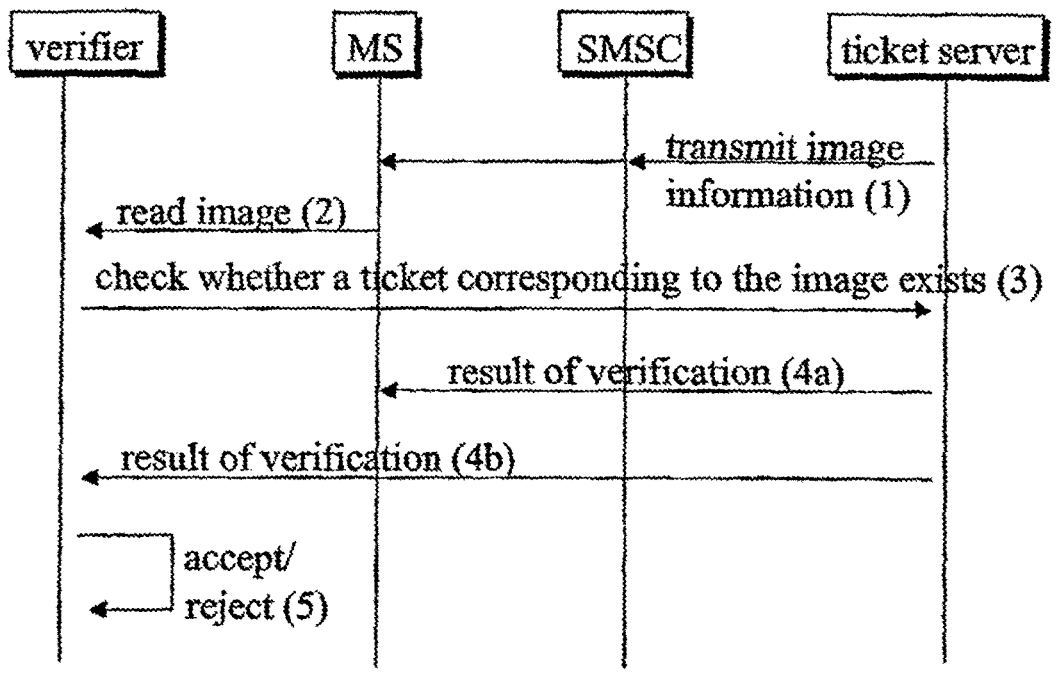
FIG. 1 presents a diagram representing a method according to the invention.

FIG. 1 presents a flow diagram representing a method according to the invention by way of example, in which method the verification of authorization information is performed mechanically. The actual ordering and purchase of the information to be verified have already taken place, and the ticket server functioning as an authorization server knows who is the legal owner of the information to be verified, so the server is able to send the authorization information to the right mobile station.

In the method, the server maintaining owner information regarding the information to be verified first sends the information to be verified to its rightful owner, step 1. The authorization information is transmitted in the form of an operator logo via a SMSC network component of the mobile communication network. Instead of a SMSC network component (Short Message Service Center, SMSC), it is possible to use e.g. a network component based on the GPRS technology. The information is presented on the display of the mobile station by using the operator logo function and read from the display by means of a detector functioning as a verifier, step 2.

If the operator logo pattern is used e.g. as an electric cinema ticket, then all the information necessary for the use of the ticket can be transmitted by the method of the invention to the user's terminal in a form which can be quickly verified visually but is still very difficult to forge/copy. In the case of a cinema ticket, the authorization information transmitted comprises information relating to the movie, such as e.g. use by date, time, seat/seats reserved and a part of the title of the movie. Moreover, the authorization information comprises information relating to visual inspection, such as e.g. an array of predetermined patterns of a stochastic form. The array of patterns is used e.g. so that the array of patterns to be used in connection with each showing in the cinema is different. In this way the authenticity of the ticket being used is verified visually. In addition, if the information is only sent to the client a moment before the application of the ticket, the users will also not see the logo containing the Information until just before the application of the ticket, so it will be very difficult to fabricate any homemade tickets.

The detector comprises e.g. a display reader. For example, for verification of the information to be verified which the user has ordered, the user places the mobile station in a reader, which takes a picture of the display of the mobile station and performs an OCR-type (Optical Character Recognition, OCR) examination of the information presented on the display. The information to be verified comprises e.g. a bar code, or completely stochastic patterns which cannot be distinguished from each other by the human eye. Each ticket bears a unique pattern unambiguously identifying the ticket. The verifying device contains stored information containing all the patterns belonging to the set of tickets in question, so this feature makes it possible to completely eliminate any attempts at forging a ticket, yet without requiring the client to perform any time-consuming operations on his mobile station; it is sufficient for the client to keep his mobile station for a very short time in the reader. Further, in the communication between the mobile station and the verifying device, it is possible to take advantage of solutions based on Bluetooth technology. 'Bluetooth' is a wireless transmission technology designed for short distances, which is described in greater detail e.g. at WWW address www.bluetooth.com.

In step 3, the verifying device checks whether a ticket corresponding to the image presented as an operator logo exists or not. This check may be performed e.g. as an inquiry sent to the server having issued the ticket, or the information required for the verification may be stored in conjunction with the verifying device. The result of the verification is transmitted to the mobile station, step 4a, and/or to the verifying device, step 4b. In step 5, the ticket is either rejected or accepted.

Figure 2:
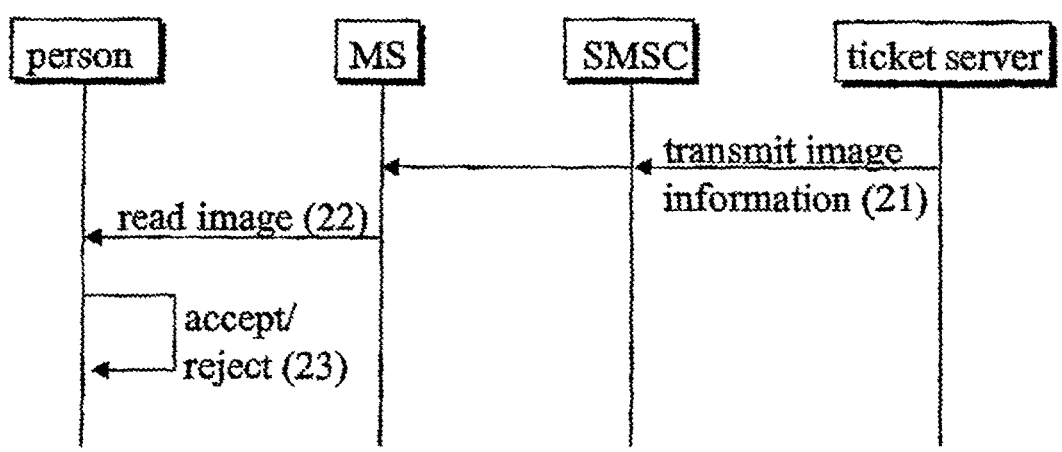
FIG. 2 presents a diagram representing a method according to the invention.

FIG. 2 presents by way of example a method according to the invention in the form of a flow diagram, in which method the authorization information is verified visually by a person. The actual ordering and purchase of the information have already taken place, and the ticket server functioning as an authorization server knows who is the rightful owner of the information to be verified, so the server is able to send the authorization information to the right mobile station. In the method, the server maintaining information regarding the owner of the information to be verified first sends the information to be verified to its rightful owner, step 21. The authorization information is transmitted as an operator logo via the SMSC network component of the mobile communication network. Instead of the SMSC network component (Short Message Service Center, SMSC), it is possible to use e.g. a network component based on GPRS technology. The information is presented on the display of the mobile station by using the operator logo function, and it is read from the display by a person acting as an inspector, step 22. In step 23, the ticket or equivalent information transmitted in each case as authorization information is accepted or rejected. The method illustrated in FIG. 2 is particularly well suited for the transmission of e.g. patterns giving a right to a discount, such as e.g. a cash voucher for a packet of coffee, which needs to be verified quickly at a cash desk and which, because of the low value, is unlikely to be forged.

Figure 3:
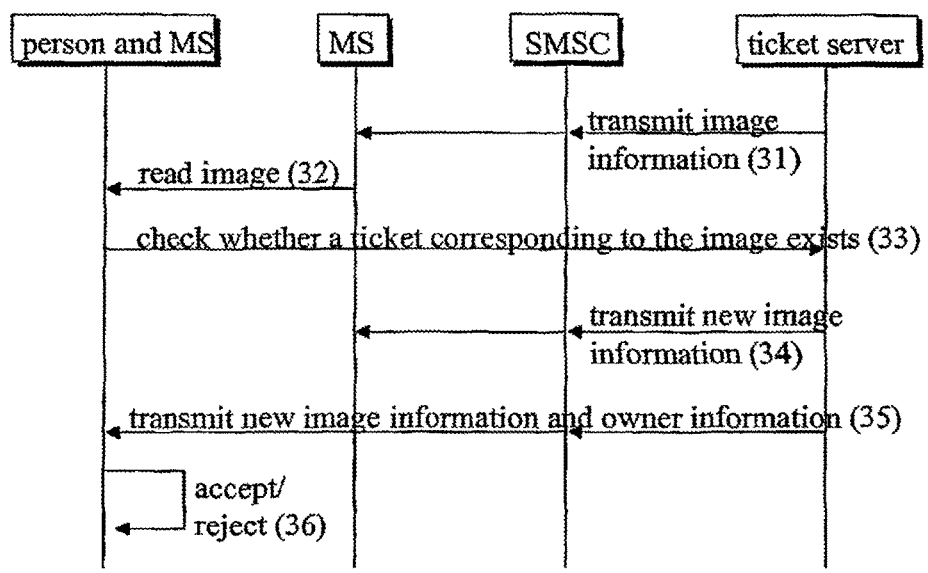
FIG. 3 presents a diagram representing a method according to the invention.

FIG. 3 presents by way of example a method according to the invention in the form of a flow diagram, in which method the authorization information is verified visually by a personal, and in which method, in the event of ambiguity, the person performing the verification, in addition to visual verification, also contacts a ticket server functioning as an authorization server to check the authenticity of the information to be verified. The actual ordering and purchase of the information have already taken place, and the ticket server functioning as an authorization server knows who is the rightful owner of the information to be verified, so the server is able to send the authorization information to the right mobile station. In the method, the server maintaining information regarding the owner of the information to be verified first sends the information to be verified to its rightful owner, step 31. The authorization information is transmitted as an operator logo via the SMSC network component of the mobile communication network. Instead of the SMSC network component (Short Message Service Center, SMSC), it is possible to use e.g. a network component based on GPRS technology. The information is presented on the display of the mobile station by using the operator logo function, and it is read from the display by the person acting as an inspector, step 32.

Next, to obtain further surety, the person acting as a verifier sends a confirmation request e.g. by calling/sending a short message to a predetermined service number, from where he is connected e.g. to a server of the owner of the information to be verified, step 33. The verification is based either on the telephone number of the client's mobile station or on an identifier included in the information to be verified, said identifier consisting of e.g. a stochastically changing sequence of digits which in connection with the ordering of the ticket has been linked to the ordering party. Thus, the verifier can inquire to whom a ticket provided with a given sequence of digits has been sold. After this, a confirmation message consisting of image or equivalent information is transmitted to the mobile station of the client being scrutinized, said message allowing the ticket inspector to definitely ascertain the rightful owner of the ticket, step 34. In practice, the confirmation message is e.g. the original pattern sent against an operator logo. In addition/alternatively, the confirmation data can be sent e.g. to the inspector's mobile station, step 35. In this case, the confirmation comprises e.g. the information to be verified as an operator logo and owner information in the form of text. To guarantee the reliability of the verification, it can only be performed from predetermined numbers. In step 36, the ticket or equivalent transmitted in each case as authorization information is accepted or rejected.

The invention is not limited to the examples of its embodiments described above; instead, many variations are possible within the inventive idea defined in the claims.

What is claimed is:

1. An authorization server comprising:
   a transmitter configured to transmit information to a mobile station, wherein the information corresponds to a completed transaction to be verified; and
   a processor communicatively coupled with the transmitter and configured to receive a request from a verifying device to verify the completed transaction, wherein the verification device is not capable of ordering and purchasing, to generate a verification result indicating a verification status of the completed transaction, in response to the request received from the verifying device, wherein the verifying device is configured to receive information from the mobile device and transmit the request to verify the completed transaction to the authorization server based on the information received from the mobile station, wherein the verification device and the mobile device are separate devices, wherein the processor sends a result of the verification to both the verification device and the mobile device.

2. The system of claim 1, wherein the authorization server further comprises a memory communicatively coupled with the processor and configured to store an association between the transaction and the mobile station.

3. The system of claim 1, wherein the authorization server further comprises a receiver communicatively coupled with the processor and configured to receive the request to verify the transaction from the verifying device.

4. The system of claim 3, wherein the information to be verified is obtained via a display reader configured to read the information from a display of the mobile station.

5. The system of claim 3, wherein the receiver comprises a wireless communications receiver configured to receive the information through a wireless connection.

6. An authorization device configured to verify transactions, the authorization device comprising:
 a processor;
 a receiver communicatively coupled to the processor, wherein the receiver is configured to receive information corresponding to a completed transaction to be verified from a mobile station; and
 a transmitter communicatively coupled to the processor, wherein the transmitter is configured to transmit a verification result to a verifying device based on the information received from the mobile station, wherein the verification result indicates a verification status of the completed transaction, wherein the verification device is not capable of ordering and purchasing, and wherein the verifying device is configured to provide the verification result to the mobile station.

7. The authorization device of claim 6, wherein the verifying device and the mobile station are separate devices.

8. The authorization device of claim 6, wherein the information from the mobile station is received via display reader configured to read the information from a display of the mobile station.

9. The authorization device of claim 8, wherein the display reader comprises an optical character recognition (OCR) reader.

10. The authorization device of claim 6, wherein the receiver is configured to receive the information through a wireless connection with the mobile station.

11. The authorization device of claim 6, wherein the authorization device communicates the verification result to the mobile station.

12. A method comprising:
 receiving, at an authorization server, transaction information from a mobile station, wherein the transaction information corresponds to a completed transaction to be verified;
 receiving, at the authorization server, a request to verify the transaction from a verifying device based on the transaction information received from the mobile station, wherein verification indicates a verification status of the completed transaction, wherein the verification device is not capable of ordering and purchasing;
 generating a verification result at the authorization server;
 communicating the verification result to the verifying device; and
 communicating the verification result to the mobile station.

13. The method of claim 12, wherein the verifying device and the mobile station are separate devices.

14. The method of claim 12, wherein the transaction information is provided after the transaction occurs.

15. The method of claim 12, wherein the transaction information comprises image information.

* * * * *